Oct. 8, 1957 W. E. WOOD 2,808,924
BEARING TAKE-UP FOR CONVEYORS AND THE LIKE
Filed Sept. 6, 1955
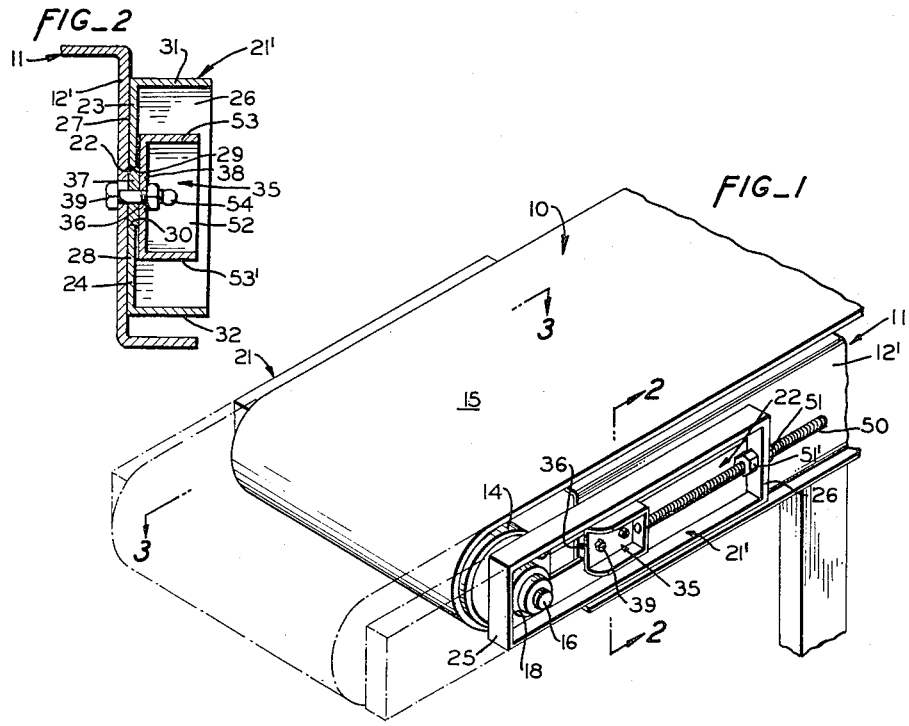
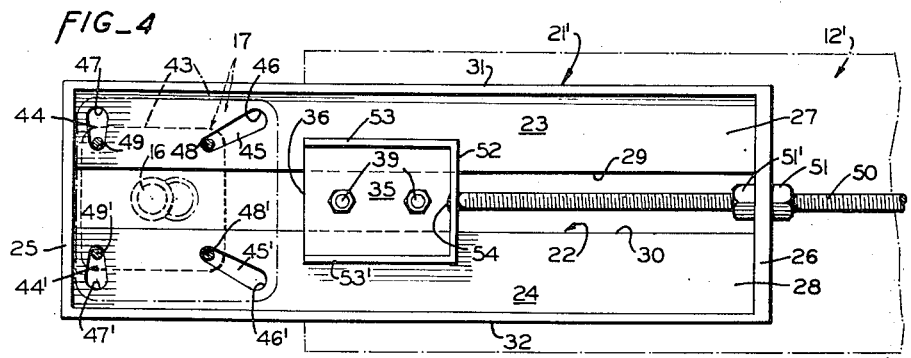
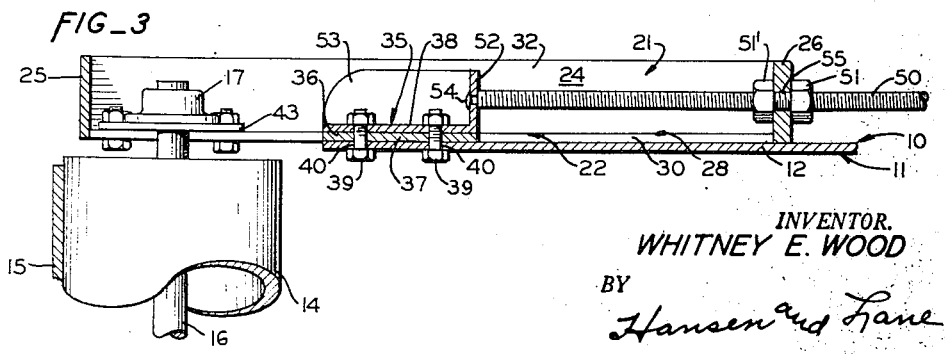
INVENTOR.
WHITNEY E. WOOD
BY
Hansen and Lane
ATTORNEYS

United States Patent Office 2,808,924
Patented Oct. 8, 1957

2,808,924

BEARING TAKE-UP FOR CONVEYORS AND THE LIKE

Whitney E. Wood, San Jose, Calif.

Application September 6, 1955, Serial No. 532,709

6 Claims. (Cl. 198—208)

This invention relates to tensioning devices and more particularly to a bearing take-up for conveyors and/or drive means of the endless chain or belt type.

More specifically this invention is concerned with the provision of a take-up device for use on one end, preferably the discharge end, of a belt conveyor in a manner to extend beyond the framework of such conveyor in cantilever fashion and to be adjustable relative to the same.

It is an object of this invention to provide in a belt tensioner for the bearings of an idler roller and shaft, take-up frames which are slidably adjustable relative to one end of a conveyor framework.

Another object is to provide in a tensioner a pair of take-up frames each of which is secured to the sides of the conveyor framework in a simple manner by an anchorage means which serves to guide the take-up frames for movement relative to the conveyor frame.

Another object is to provide a simple screw arrangement between the supporting anchorage and the take-up frame for effective tensioning of the conveyor belt.

These and other objects and advantages of this invention will become apparent from a reading of the following description and the accompanying drawings in which:

Fig. 1 is a perspective view of one end of a conveyor provided with a belt tensioning device embodying the take-up device of the present invention.

Fig. 2 is a vertical section through one side arm of the take-up frame illustrated in Fig. 1 and taken along line 2—2 thereof.

Fig. 3 is a horizontal, longitudinal section through the other side arm of the new take-up device of Fig. 1 taken substantially along line 3—3 thereof.

Fig. 4 is a side elevational view of the side arm and connecting means therefor only of the device illustrated in Figs. 1, 2 and 3.

Referring now to Figs. 1 and 3, the conveyor 10 generally includes a framework 11 comprising parallel side rails 12—12' each of which may be a plate, a channel or as shown in Figs. 1 and 2, a Z-shaped section of metal suitably secured to legs L for supporting the same above the floor.

The conveyor 10 as illustrated in Fig. 1 is provided at one end with an idler pulley or roller 14 over which an endless belt 15 is trained in the conventional manner. This roller 14 is secured to a shaft 16 having its ends extending from the roller 14 for journaling or support in suitable bearings 17—18 at either side of the conveyor framework 11.

The present invention although embodying conventional bearings (17—18) is concerned with the manner of supporting these bearings in a particular manner relative to the framework 11 and also contemplates a support for bearings which enables replacement as well as interchangeability thereof in an economical and facile manner. Moreover, the support for the bearings provided by this invention facilitates the disposition of the bearings beyond the end of the framework 11 thus avoiding the necessity of any alteration in the structure of the framework such as slotting thereof as has heretofore been the practice to permit adjustment of the shaft 16 relative to the end of the conveyor.

In accordance with the present invention, a tensioning device 20 is provided. This tensioning device 20 comprises a pair of take-up frames 21 and 21' on the right and left side of the framework 11 respectively. Both take-up frames 21 and 21' are identical in construction and therefore like reference numerals indicate like parts in each.

Each take-up frame (21 or 21') consists of a rigid structural member affording cantilever support for the respective bearing (17 or 18) which it is to carry. In this connection each take-up frame is an elongated box-like structure provided with a longitudinal slot or guideway 22. The take-up frame (21 or 21') illustrated, comprises a pair of angle iron sides 23—24 secured in spaced relation by a pair of metal end walls 25—26 which have been welded to the ends of the angle iron sides. The two angle iron sides 23—24 have their base flanges 27—28 disposed in a common plane with their inner edges 29—30 facing each other but spaced from one another to provide the guideway 22 hereinbefore mentioned.

The other or outer flanges 31—32 of the side angle irons 23—24, respectively, are disposed parallel to each other at the outer edges of the side angle irons and the end walls 25—26 have their ends welded to the ends of the flanges 31—32 and their bottom edges welded to the base flanges 27—28 of the side angle irons where they touch the same.

From the foregoing it will be seen that the outer flanges 31—32 of the side angle irons 23—24 cooperate with the end walls 25—26 to provide a rectangle forming the sidewalls of the elongated box-like structure of the take-up frame (21 or 21') while the base flanges 27—28 of the side angle irons form the bottom of this box-like structure. In this manner a sturdy, rigid cantilever beam is provided for operating in a manner now to become apparent.

The cantilever type take-up frames 21—21' are each adapted to be supported adjacent the side rails 12—12', respectively, of the framework 11 and in parallelism with the side rails 12—12' as well as for longitudinal movement relative thereto. To this end each side of the tensioning device 20 of the present invention includes means for supporting each take-up frame 21—21' in the manner and for the purpose just explained.

The means for supporting one of the take-up frames 21 or 21' is generally designated 35 in the drawings. It comprises a member 36 adapted to be operatively associated with the slot or guideway 22 provided in the take-up frame. In accordance with the present invention, however, while the member 36 is adapted for relative movement in the slot or guideway 22, it is not in fact a rider but rather a guide by which longitudinal movement of the take-up frame itself is afforded.

In the present disclosure the guide member 36 comprises laminated plates 37—38, plate 38 being wider than the gap between inner edges 29—30 of the base flanges 27—28 of the side angle irons 23—24 while the plate 37 is of a width such as to fit into the slot 22 with sufficient clearance to afford a relative sliding movement with respect to the base flanges 27—28. Moreover, the plate 37 is of a thickness slightly greater than the thickness of the base flanges 27—28 to provide a clearance sufficient to afford said relative sliding movement between the guide member 36 and the base flanges 27—28 of the side angle irons 23—24.

The foregoing details are important because the inner plate 37 also serves as a shim between the outer plate 38 and the side rail 12 or 12' of the framework 11 to which it is to be attached. In this connection the guide member 36 is bored at two places along its longitudinal axis to receive the shanks of a pair of bolts 39. These bolts 39 have their threaded ends disposed to fit through holes 40 bored in the web of the side rail 12 or 12' of the framework 11. The bores 40 are preferably as close as possible to the ends of the side rails 12—12' and the guide member 36 is secured to the latter by nuts 41 tightened down firmly upon the threaded ends of the bolts 39.

From the foregoing it will be appreciated that each take-up frame 21 and 21' is now disposed for longitudinal movement relative to the respective side rails 12 and 12' of the framework 11. Moreover, the take-up frames 21—21' are supported at the sides of the framework 11 for extension in cantilever fashion from the ends thereof.

As previously mentioned the conveyor 10 includes the roller 14 secured to the shaft 16 which is journaled at its ends in bearings 17—18. These bearings may be of any stock or standard size of the type having a mounting flange 43 provided with bolt holes at its four corners. The ends of the shaft 16 extend through the slots 22 in the take-up frames 21—21' at each side of the conveyor and the bearings 17—18 are disposed within the box-like structure provided by each take-up frame. Thus it will be seen that the bearing 17 or 18 is wholly confined within the box-like take-up frame 21 or 21' adjacent the one end wall 25 thereof. This is so irrespective of whether the bearing 17 or 18 be of large or small capacity and/or size, the take-up frame being so constructed as to accommodate a wide range of bearing sizes according to the needs of a particular conveyor.

In connection with the foregoing it will be noted that the base flange 43 of the bearing 17 or 18 lies flush against the two base flanges 27—28 of the take-up frame 21 or 21' as the case may be. These base flanges 27—28 are provided with bolt receiving slots 44—44' adjacent the end wall 25 of the take-up frame while two other bolt slots 45—45' are provided inwardly thereof, see Fig. 4. The bolt slots 44—44' extend transversely of the flanges 27—28, i. e., the take-up frame, while the bolt slots 45—45' are diagonally disposed, their outer arcuate ends 46—46' being the same distance from the longitudinal axis of the slot 22 as are the outer ends 47—47' of the transverse slots 44—44'. Moreover, the inner arcuate ends 48—48' of the diagonally extending slots 45—45' are the same distance from the longitudinal axis of the slot as the inner arcuate ends 49—49' of the transverse slots 44—44'. In addition to the foregoing, the inner ends 48—48' of slots 45—45' are the same distance from the inner ends 49—49' of slots 44—44' as they are from each other so as to register with the bolt holes at the four corners of the flange 43 of a small sized bearing. By the same token, the outer ends 46—46' of the diagonal slots 45—45' are the same distance from the outer ends 47—47' of the transverse slots 44—44' as they are from each other so as to register with the bolt holes at the four corners of the flange 43 of a large sized bearing. Thus it will be seen that any intermediate sized bearing is equally well accommodated by the bearing support provided in the tensioning device 20 of the present invention.

Means for moving the take-up frame (21—21') longitudinally along side the framework 11 comprises a conventional screw rod 50 and riders or nuts 51—51' thereon correlated in a novel fashion with the take-up frame of the present invention. As illustrated in Figs. 1, 3 and 4, the guide member 36 constitutes the anchorage for the entire tensioning device. Therefore it forms the abutment or base from which force is applied to the take-up frame in order to tension or tighten the conveyor belt 15.

The guide member 36 is provided with an end flange 52 braced by side flanges 53—53' all of which are formed integrally with the outer plate 38 of the guide member.

The screw rod 50 has one of its ends 54 suitably secured to the aft side of the end flange 52 and extends rearwardly therefrom. The aft end wall 26 of the take-up frame (21 or 21') is provided with a bore 55 through which the screw rod 50 extends. One nut 51 on the screw rod 50 is disposed on the fore side of the aft end wall 26 while the other nut 51' on the screw rod is disposed on the other or aft side of the end wall 26. Consequently, upon threading of the nut 51' away from the end wall 26 and screwing of the nut 51 against the end wall 26 the take-up frame is caused to move in an aft direction, i. e., toward the conveyor framework 11. However, when the nut 51 is released (threaded forwardly up the screw rod 50) and the nut 51' screwed against the aft wall 26 of the take-up frame the latter is caused to move forwardly relative to the conveyor framework to thereby force the roller 14 tightly against the belt 15 to tension or tighten the same.

From the foregoing it will be appreciated that the idler roller 14 of the conveyor 10 is supported beyond the extreme end of the framework 11 thereof in cantilever fashion. This enables the roller 14 to overlie a receptacle or a conveyor extending transverse to the conveyor 10 which would otherwise not occur if the roller were confined between the side rails 12—12' thereof. Moreover, by this arrangement, no structural change in the side rails 12—12' is required, such for example as cutting slots into the same to accommodate the shaft 16 by which the pulley is supported.

It will therefore be appreciated that the tensioning device of the present invention affords an attachment for conventional conveyors; can be applied thereto with a minimum of cost and labor; is adapted to support bearings of various sizes; and is simple to operate for maintaining the conveyor belt under proper tension.

While I have described my new tensioning device in specific detail, it will be apparent that it is susceptible to variations, modifications and/or alterations without departing from the spirit of my invention. I therefore desire to avail myself of all variations, modifications and/or alterations as fairly come within the purview of the appended claims.

What I claim as new and desire to protect by Letters Patent is:

1. In a tensioning device for use on conveyors and the like provided with idlers secured to a shaft having its ends journaled in bearings adapted to be supported at the respective sides of the framework of said conveyor; a bearing take-up comprising a pair of frames each including an elongated structural member having a slot formed therein along the longitudinal axis thereof; each said structural member having one of said bearings secured thereto adjacent its fore end, a guide member secured to the side wall of the framework of said conveyor as close as possible to the very end thereof including a shim section disposed within said elongated slot with its edges in sliding engagement with the marginal edges of said elongated slot and an outer section overlying said shim section and the marginal edges on both sides of said elongated slot for maintaining said frame adjacent the sidewall of said framework for longitudinal extension in cantilever fashion beyond the very end thereof, and means between said guide member and the aft end of said structural member for moving said structural member relative to said guide member.

2. In a tensioning device for idler rollers or wheels secured to a shaft having its ends journaled in bearings adapted to be supported at the respective sides of a stationary framework; a bearing take-up comprising a pair of frames each including an elongated structural member having a slot formed therein along the longitudinal axis thereof, each said structural member having one of said bearings secured thereto adjacent its fore end, a guide member secured to the side wall of said stationary framework as close as possible to the very end thereof including a shim section disposed within said elongated slot with its edges in sliding engagement with the marginal edges of said elongated slot and an outer section overlying said shim section and the marginal edges on both sides of said elongated slot for maintaining said frame adjacent the sidewall of said framework for longitudinal extension in cantilever fashion beyond the very end thereof, a screw rod having one end secured to said guide member and extending rearwardly therefrom through the aft end of said structural member, and a rider threaded on said screw rod on the rearward side of the aft end of said structural member for urging the same toward said guide member.

3. A bearing take-up for use on conveyors and the like provided with an endless belt trained around an idler roller secured to a shaft having its ends journaled in bearings adapted to be supported at the respective sides of the framework of said conveyor; comprising a pair of take-up frames each including an elongated structural member having a slot formed therein along the longitudinal axis thereof, a guide member secured to the side wall of the framework of said conveyor as close as possible to the very end thereof including a shim section disposed within said elongated slot with its edges in sliding engagement with the marginal edges of said elongated slot and an outer section overlying said shim section and the marginal edges on both sides of said elongated slot for maintaining said frame adjacent the sidewall of said framework for longitudinal extension in cantilever fashion beyond the very end thereof, means between said guide member and the aft end of said structural member for moving said structural member relative to said guide member, and means at the fore end of said structural member for supporting one of said bearings on the exterior side thereof with said shaft for the idler roller extending through the slot formed in said structural member.

4. A bearing take-up device for use on apparatus such as a conveyor provided with an endless belt trained around an idler roller secured to a shaft having its ends journaled in bearings adapted to be supported at either side of the framework of said conveyor; comprising a pair of take-up frames each including a pair of angle irons each having one of their flanges disposed in a common plane and their opposite flanges outwardly disposed and joined at their opposite ends by fore and aft upstanding walls so as to provide an elongated box-like structure, the inner edges of said one pair of flanges which are disposed in said common plane being spaced from each other to define an elongated slot, one end of said one pair of flanges being bored adjacent said fore-end wall to receive bolts extending from one of said bearings for securing the latter to said frame with said shaft extending through said elongated slot, and an anchorage member secured to the side wall of the framework of said conveyor as close as possible to the very end thereof comprising a shim section disposed within said elongated slot with its edges in sliding engagement with the inner edges of said one pair of said flanges, said shim being of a thickness slightly greater than the thickness of said one pair of said flanges, and an outer section overlying said shim and the inner edges of said one pair of said flanges on both sides of said elongated slot for maintaining said frame adjacent the sidewall of said framework for longitudinal extension in cantilever fashion beyond the very ends thereof, a screw rod secured to said outer section of said anchorage member and extending rearwardly therefrom parallel to said elongated slot and toward said aft end wall, and a rider on said screw rod engageable with said aft end wall for moving said frame relative to said anchorage member.

5. In a tensioning device of the type including parallel bearing take-up frames provided with bearings for the ends of a shaft supporting an idler roller relative to one end of a stationary framework, each of said bearing take-up frames comprising an elongated box-like structure having a slot formed lengthwise thereof along its longitudinal axis, means at the fore end of said box-like structure for supporting one of said bearings within the same with said shaft extending through said slot, an anchorage for securing said box-like structure to said stationary framework as close as possible to one end thereof comprising a guide member having a portion thereof disposed within said slot and to bear against the sidewall of said conveyor framework and another portion overlying the margins of said slot cooperating with the sidewall of said conveyor framework to provide a guideway for said structural member affording extension thereof in cantilever fashion from said one end of said stationary framework, a screw shaft having one end secured to said anchorage with its opposite end extending through the aft end of said box-like structure, and a rider threaded on said screw shaft for bearing against the aft side of the aft end of said box-like structure for urging the latter in a forward direction relative to said stationary framework.

6. In a tensioning device for a conveyor or the like of the type including an endless belt trained around an idler roller secured to a shaft having its ends journaled in bearings adapted to be supported at either side of the framework of said conveyor, a bearing take-up comprising a pair of frames each including an elongated box-like structure having a slot formed lengthwise thereof between its fore and aft ends, means at the fore end of said box-like structure for supporting one of said bearings within the same with said shaft extending through said slot, an anchorage for securing said box-like structure to one sidewall of the framework of said conveyor as close as possible to one end thereof comprising a guide member having a shim portion thereof disposed to ride within said slot and to bear against the sidewall of said conveyor framework and an outer portion overlying the margins of the slot formed in said box-like structure so as to cooperate with the sidewall of said conveyor framework to provide a guideway for said box-like structural member to afford extension of the latter in cantilever fashion beyond said one end of the framework of said conveyor, and screw means operatively connected to said anchorage and a portion of said box-like structure for urging the latter in a forward direction relative to the framework of said conveyor.

References Cited in the file of this patent

UNITED STATES PATENTS 2,480,294    Hume _____ Aug. 30, 1949